United States Patent
Cui et al.

(10) Patent No.: US 9,757,802 B2
(45) Date of Patent: Sep. 12, 2017

(54) ADDITIVE MANUFACTURING METHODS AND SYSTEMS WITH FIBER REINFORCEMENT

(71) Applicant: General Electric Company, Schenectady, NY (US)

(72) Inventors: Yan Cui, Greer, SC (US); Srikanth Chandrudu Kottilingam, Simpsonville, SC (US); Dechao Lin, Greer, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 14/318,909

(22) Filed: Jun. 30, 2014

(65) Prior Publication Data

US 2015/0375340 A1    Dec. 31, 2015

(51) Int. Cl.
*B22F 3/105* (2006.01)
*B23K 26/00* (2014.01)
*B23K 26/342* (2014.01)
*C22C 47/14* (2006.01)
*C22C 49/02* (2006.01)
*B29C 67/00* (2017.01)
*B33Y 80/00* (2015.01)
(Continued)

(52) U.S. Cl.
CPC .......... *B22F 3/1055* (2013.01); *B23K 26/00* (2013.01); *B23K 26/342* (2015.10); *B29C 67/0077* (2013.01); *C22C 47/14* (2013.01); *C22C 49/02* (2013.01); *B28B 1/001* (2013.01); *B33Y 10/00* (2014.12); *B33Y 80/00* (2014.12); *Y02P 10/295* (2015.11)

(58) Field of Classification Search
CPC ..................................................... B22F 3/1055
See application file for complete search history.

(56) References Cited

U.S. PATENT DOCUMENTS

| 4,147,538 A * | 4/1979 | Yajima ............... C22C 49/08 528/31 |
| 5,495,979 A | 3/1996 | Sastri et al. |
| 6,064,031 A | 5/2000 | Talwar |

(Continued)

FOREIGN PATENT DOCUMENTS

| EP | 2620594 A1 | 7/2013 |
| EP | 2570595 B1 | 10/2013 |

(Continued)

OTHER PUBLICATIONS

European Search Report and Opinion issued in connection with corresponding EP Application No. 15174469.5 dated Mar. 23, 2016.

*Primary Examiner* — Jessee Roe
*Assistant Examiner* — Ngoclan T Mai
(74) *Attorney, Agent, or Firm* — Ernest G. Cusick; Frank A. Landgraff

(57) ABSTRACT

Additive manufacturing methods for fabricating a fiber-reinforced composite objects include providing at least a first layer of powder material, disposing a fiber material adjacent the at least first layer of powder material to form a fiber reinforcement layer, and applying a laser energy to the at least first layer of powder material so as to fuse the powder material into at least a first laser fused material layer adjacent the fiber reinforcement layer of the fiber-reinforced composite object.

8 Claims, 3 Drawing Sheets

(51) Int. Cl.
   *B28B 1/00*           (2006.01)
   *B33Y 10/00*       (2015.01)

(56) References Cited

U.S. PATENT DOCUMENTS

| | | |
|---|---|---|
| 6,144,008 A | 11/2000 | Rabinovich |
| 6,682,688 B1 | 1/2004 | Higashi et al. |
| 6,814,823 B1 * | 11/2004 | White ............... B23K 11/0013 156/73.1 |
| 7,318,547 B2 | 1/2008 | Gasse |
| 8,141,364 B2 | 3/2012 | Benoit et al. |
| 8,161,753 B2 | 4/2012 | Benoit et al. |
| 8,506,836 B2 | 8/2013 | Szuromi et al. |
| 2007/0238056 A1 | 10/2007 | Baumann et al. |
| 2008/0131723 A1 | 6/2008 | Tucker et al. |
| 2008/0190552 A1 | 8/2008 | Bouillon et al. |
| 2013/0071562 A1 | 3/2013 | Szumori et al. |
| 2013/0149182 A1 | 6/2013 | Sreshta et al. |
| 2013/0195673 A1 | 8/2013 | Godfrey et al. |
| 2014/0050921 A1 * | 2/2014 | Lyons ................ B29C 67/0051 428/372 |
| 2014/0126995 A1 | 5/2014 | Schick et al. |
| 2015/0060403 A1 * | 3/2015 | Carter ...................... F02C 7/30 216/53 |
| 2016/0114430 A1 * | 4/2016 | Bruck ................... B23K 9/042 219/73.21 |

FOREIGN PATENT DOCUMENTS

| | | |
|---|---|---|
| EP | 2918394 A1 | 9/2015 |
| GB | 2493398 A | 2/2013 |
| WO | 2013136096 A1 | 9/2013 |
| WO | 2014071135 A1 | 5/2014 |

\* cited by examiner

ADDITIVE MANUFACTURING METHODS AND SYSTEMS WITH FIBER REINFORCEMENT

BACKGROUND OF THE INVENTION

The subject matter disclosed herein relates to additive manufacturing methods and systems and, more specifically, to additive manufacturing methods and systems with fiber reinforcement.

Additive manufacturing processes generally involve the buildup of one or more materials to make a net or near net shape object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model. One exemplary additive manufacturing process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics may be used. Laser sintering or melting is one exemplary additive manufacturing process for rapid fabrication of functional prototypes and tools. Applications can include patterns for investment casting, metal molds for injection molding and die casting, molds and cores for sand casting, and relatively complex components themselves. Fabrication of prototype objects to facilitate communication and testing of concepts during the design cycle are other potential uses of additive manufacturing processes. Likewise, components comprising more complex designs, such as those with internal passages that are less susceptible to other manufacturing techniques including casting or forging, may be fabricated using additive manufacturing methods.

Laser sintering can refer to producing three-dimensional (3D) objects by using a laser beam to sinter or melt a fine powder. Specifically, sintering can entail fusing (agglomerating) particles of a powder at a temperature below the melting point of the powder material, whereas melting can entail fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate, and the effects of processing parameters on the microstructural evolution during the layer manufacturing process can lead to a variety of production considerations. For example, this method of fabrication may be accompanied by multiple modes of heat, mass and momentum transfer, and chemical reactions.

Laser sintering/melting techniques can specifically entail projecting a laser beam onto a controlled amount of powder material (e.g., a powder metal material) on a substrate (e.g., build plate) so as to form a layer of fused particles or molten material thereon. By moving the laser beam relative to the substrate along a predetermined path, often referred to as a scan pattern, the layer can be defined in two dimensions on the substrate (e.g., the "x" and "y" directions), the height or thickness of the layer (e.g., the "z" direction) being determined in part by the laser beam and powder material parameters. Scan patterns can comprise parallel scan lines, also referred to as scan vectors or hatch lines, and the distance between two adjacent scan lines may be referred to as hatch spacing, which may be less than the diameter of the laser beam so as to achieve sufficient overlap to ensure complete sintering or melting of the powder material. Repeating the movement of the laser along all or part of a scan pattern may facilitate further layers of material to be deposited and then sintered or melted, thereby fabricating a three-dimensional object.

For example, laser sintering and melting techniques can include using continuous wave (CW) lasers, such as Nd:YAG lasers operating at or about 1064 nm. Such embodiments may facilitate relatively high material deposition rates particularly suited for repair applications or where a subsequent machining operation is acceptable in order to achieve a finished object. Other laser sintering and melting techniques may alternatively or additionally be utilized such as, for example, pulsed lasers, different types of lasers, different power/wavelength parameters, different powder materials or various scan patterns to facilitate the production of one or more three-dimensional objects. However, the resulting physical characteristics (e.g., strength, weight, density, etc.) of the three-dimensional object may be dependent on the original powder material composition and the subsequent effect of sintering and/or melting said powder material.

Accordingly, alternative additive manufacturing methods and systems with fiber reinforcement would be welcome in the art.

BRIEF DESCRIPTION OF THE INVENTION

In one embodiment, an additive manufacturing method for fabricating a fiber-reinforced composite object is disclosed. The method includes providing at least a first layer of powder material, disposing a fiber material adjacent the at least first layer of powder material to form a fiber reinforcement layer, and applying a laser energy to the at least first layer of powder material so as to fuse the powder material into at least a first laser fused material layer adjacent the fiber reinforcement layer of the fiber-reinforced composite object.

In another embodiment, a fiber reinforced composite object manufactured by additive manufacturing is disclosed. The fiber reinforced composite object includes a plurality of laser fused material layers comprising powder material fused by a laser; and, at least one fiber reinforcement layer disposed between adjacent laser fused material layers.

In yet another embodiment, an additive manufacturing system for manufacturing a fiber reinforced composite object is disclosed. The additive manufacturing system includes a build plate, a powder recoater that disposes powder material layers onto the build plate, and a fiber weaver that disposes fiber material layers onto the build plate. The additive manufacturing system further includes a laser generating system that generates a laser beam directed towards the build plate so as to sinter the powder material layers disposed thereon so as to iteratively build a plurality of laser fused material layers of the fiber reinforced composite object, with at least one fiber reinforcement layer of the fiber material disposed between adjacent laser fused material layers.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
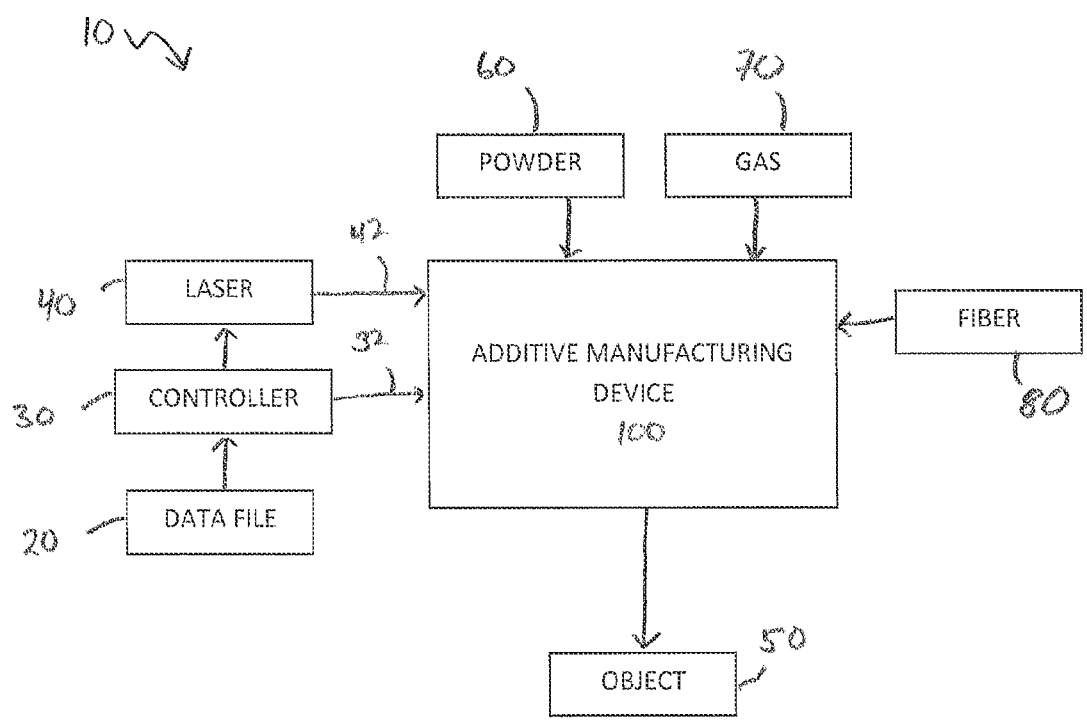
FIG. 1 illustrates an exemplary diagram of an additive manufacturing system according to one or more embodiments shown or described herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Additive manufacturing methods and systems disclosed herein can be utilized to manufacture fiber reinforced composite objects. Specifically, one or more fiber reinforcement layers maybe integrated with a plurality of laser fused material layers via an additive manufacturing method/system incorporating a fiber weaver that disposes fiber material onto the build plate along with the powder recoater that disposes powder material onto the build plate. The laser may thereby sinter the individual layers of powder material while one or more fiber reinforcement layers are incorporated therein. The resulting fiber reinforced composite object can thereby possess different physical characteristics (e.g., strength, weight, density, etc.) as a result of the fiber reinforcement layer(s). Specifically, strength may be increased in one or more directions depending on the strength and/or orientation of the fiber material. Furthermore, the weight of the overall fiber reinforced composite object may be altered (e.g., reduced) with respect to a non-fiber reinforced composite object by replacing at least some of the powder material with the fiber material. In even some embodiments, the fiber material may comprise hollow tubes to facilitate additional functionality to the fiber reinforced composite object such as by providing hollow passageways for internal gas and/or fluid flow to assist in heating, cooling or the like. These and additional embodiments should become better appreciated as additive manufacturing methods, additive manufacturing systems and fiber reinforced composite objects manufactured from the same are disclosed in more detail herein.

It should also be appreciated that as used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

Figure 2:
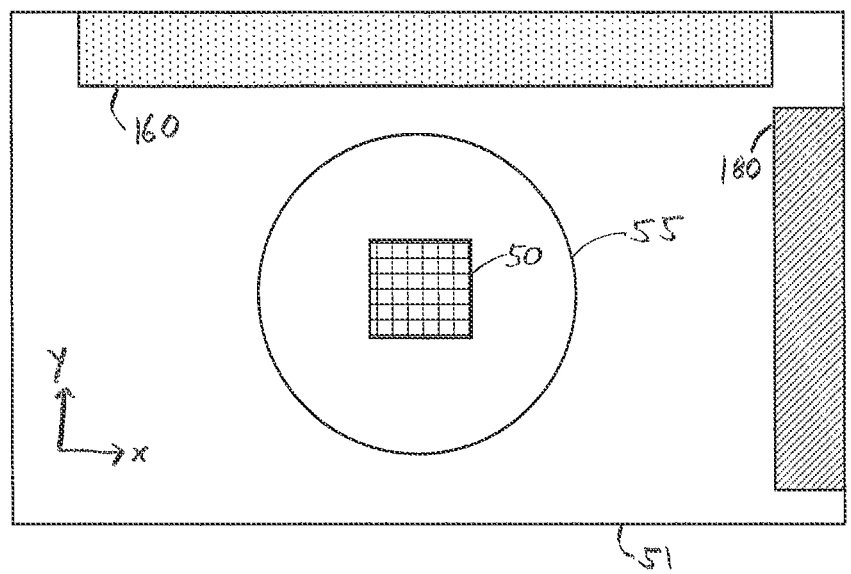
FIG. 2 illustrates an exemplary schematic of an additive manufacturing device according to one or more embodiments shown or described herein.

Referring now to FIGS. 1 and 2, a diagram of an exemplary additive manufacturing system 10 is illustrated. The additive manufacturing system 10 generally comprises an additive manufacturing device 100 (illustrated in greater detail in FIG. 2) that houses and/or is in communication with a plurality of components that combine to manufacture a fiber reinforced composite object 50. For example, the additive manufacturing system 10 can comprise at least a build plate 55, a powder recoater 160 that provides a powder material 60 to the build plate 55, a fiber weaver 180 that disposes a fiber material 80 onto the build plate 55, and a laser generating system 40 that can, for example, all be incorporated within a build chamber 51.

The build plate 55 can comprise any surface that receives the powder material 60 and fiber material 80 during the build process. In some embodiments, the build plate 55 may be moveable. For example, the build plate 55 may be moveable in a vertical direction to facilitate the layer-by-layer build process of the fiber reinforced composite object 50. In even some embodiments, the build plate 55 may be moveable in a horizontally planar direction (e.g., the x-y plane illustrated in FIG. 2). In even some embodiments, the build plate 55 may be moveable such that it can rotate about an axis. The build plate 55 may further be moveable in any other direction or directions and may be moved via any suitable mechanism (e.g., gears, motors, pinion and rack apparatus, or the like). It should be appreciated that a moveable build plate 55 may help facilitate the precise deposition of the fiber material 80 by moving with respect to the fiber weaver 180. Likewise, a moveable build plate 55 may also help facilitate the select sintering of powder material 60 by moving with respect to the laser generating system 40.

Still referring to FIGS. 1 and 2, the powder recoater 160 can comprise any device that disposes (e.g., provides) powder material 60 onto the build plate 55. It should be appreciated that depositing powder material 60 onto the build plate 55 can comprise depositing powder material 60 onto the build plate 55 directly, or depositing powder material 60 onto the fiber reinforced composite object 50 being built on the build plate 55. Specifically, the powder recoater 160 can repeatedly provide a fresh layer of powder material 60 onto the build plate 55 (including onto any partial fiber reinforced composite object 50 being built thereon) for subsequent sintering by the laser beam 42 of the laser generating system 40. The powder recoater 160 may thereby facilitate the manufacturing of the fiber reinforced composite object 50 through the layer-by-layer addition of powder material 60. In some embodiments, the powder recoater 160 may provide new powder material 60 over the entire build plate 160. In other embodiments, the powder recoater 160 may selectively provide powder material 60 to only select portions of the build plate 55 (such as only to portions where powder material 60 is needed for sintering).

The powder recoater 160 may further provide the powder material 60 in any suitable thickness for laser sintering of individual layers. Moreover, the powder recoater 160 may move in any suitable direction to facilitate the deposition of the powder material 60. For example, in some embodiments, the powder recoater 160 may translate in a single direction (e.g., the "y" direction as illustrated in FIG. 2). In other embodiments, the powder recoater 160 may move in any direction within a lateral plane (e.g., the x-y plane illustrated in FIG. 2).

The powder material 60 provided by the powder recoater 160 can comprise any material that may be sintered by the laser beam 42 of the laser generating system 40. For example, in some embodiments, the powder material can comprise a powder metal. Such powder metals can include, by non-limiting example, cobalt-chrome alloys, aluminum and its alloys, titanium and its alloys, nickel and its alloys, stainless steels, tantalum, niobium or combinations thereof. In other embodiments, the powder material 60 may comprise a powder ceramic or a powder plastic. Moreover, the powder material 60 may comprise any grain size suitable for deposition by the powder recoater 160 and sintering by the laser beam 42 of the laser 40. For example, the grain size of the powder material 60 may depend, in part, on the desired thickness of each build layer of the fiber reinforced composite object 50. In some specific embodiments, the powder material may comprise an average grain size of from about 10 microns to about 100 microns.

Still referring to FIGS. 1 and 2, the fiber weaver 180 can comprise any device that disposes (e.g., provides) fiber material 80 onto the build plate 55. It should also be appreciated that depositing fiber material 80 onto the build plate 55 can comprise depositing fiber material 80 onto the build plate 55 directly, or depositing fiber material 80 onto the fiber reinforced composite object 50 being built on the build plate 55. In some embodiments, the fiber weaver 180 may comprise a device that unwinds a spool of fiber material 80 to selectively deposit the fiber material 80 onto the build plate 55. In other embodiments, the fiber weaver 180 may lay down a blanket of fiber material 80 across an entire area. In even some embodiments, the fiber weaver 180 may selectively deposit or "print" fiber material in select locations.

Moreover, the fiber weaver 180 may move in any suitable direction to facilitate the deposition of the fiber material 80. For example, in some embodiments, the fiber weaver 180 may translate in a single direction (e.g., the "x" direction as illustrated in FIG. 2). Such embodiments may particularly accommodate a powder recoater 160 that moves in a perpendicular direction (e.g., the "y" direction) within the same build chamber 51. In other embodiments, the fiber weaver 180 may move in any direction within a lateral plane (e.g., the x-y plane illustrated in FIG. 2).

The fiber material 80 provided by the fiber weaver 180 can comprise any material that can be disposed internal the fiber reinforced composite object 50 while sintered powder material 60 is built up around it. For example, in some embodiments, the fiber material 80 may be selected such that it does not melt from the power of the laser beam 42 when sintering adjacent powder material 60. In some embodiments, the fiber material 80 may be selected to provide increased strength or other physical characteristics of the fiber reinforced composite object 50. For example, in some embodiments, the fiber material 50 may comprise one or more metals or alloys. In even some embodiments, the fiber material 50 may comprise a carbon fiber material. In even some embodiments, the fiber material 50 may comprise hollow tubes. Such embodiments may facilitate additional functionality to the fiber reinforced composite object 50 such as by providing passageways (i.e., the hollow tubes) for internal gas and/or fluid flow to assist in heating, cooling or the like. Furthermore, in the fiber material 80 may comprise a variety of sizes and diameters that are suitable for placement within the fiber reinforced composite object 50. For example, in some embodiments the fiber material 80 may comprise a diameter that is less than a build layer thickness t (i.e., the thickness of each iterative layer of powder material 60 fused by the laser beam 42).

The fiber material 80 may be disposed in a variety of configurations on the build plate 55. For example, in some embodiments, the fiber material 80 may be disposed in a unidirectional pattern. As used herein, "unidirectional pattern" comprises a plurality of fibers all being aligned in the same, substantially parallel, direction. For example, the unidirectional pattern may comprise a plurality of fiber all running in the "x" direction. In some embodiments, the fiber material 80 may be disposed in a multidirectional pattern. As used herein, "multidirectional pattern" comprises a plurality of fibers being disposed in plurality of directions. For example, the fibers may be disposed in a bidirectional pattern such that some run in the "x" direction and some run in the "y" direction. Alternatively, the multidirectional pattern may comprise more than two different directions. In even some embodiments, multidirectional pattern may comprise a wide arrange of linear and/or non-linear fibers running in any of a variety of directions. It should be appreciated that the direction of the fiber material 80 may be selected based in part to facilitate increased strength or other physical characteristics of the fiber reinforced composite object 50 in one or more orientations.

Figure 3:
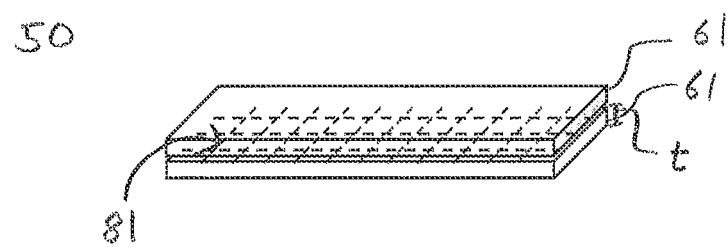
FIG. 3 illustrates an exemplary fiber reinforced composite object manufactured by the additive manufacturing system of FIG. 1 according to one or more embodiments shown or described herein; and, FIG. 4 illustrates an exemplary additive manufacturing method for fabricating the fiber reinforced composite object of FIG. 3 according to one or more embodiments shown or described herein.

Still referring to FIGS. 1 and 2, the laser generating system 40 comprises any type of laser system that can generate a laser beam 42 directed towards the build plate 55 capable of sintering the powder material 60 into a plurality of laser fused material layers (see elements 61 illustrated in FIG. 3).

Specifically, the laser generating system 40 can be configured to perform layer-by-layer and local fusing (melting or sintering) of the powder material 60. In some embodiments, the laser generating system comprises a Nd:YAG laser. In some embodiments, the laser generating system 40 comprises a fiber laser (i.e., a laser in which the active gain medium is an optical fiber doped with rare-earth elements such as erbium, ytterbium, neodymium, dysprosium, praseodymium and thulium). In such embodiments, fiber non-linearities, such as stimulated Raman scattering or four-wave mixing can also provide gain and thereby serve as gain media for the fiber laser. In even some embodiments, the laser generating system 40 comprises a Gaussian style sealed tube $CO_2$ laser. The laser generating system 40 can produce a laser beam 42 that is continuous and/or pulsed. Furthermore, the laser generating system 40 can generate a laser beam 42 having any consistent or variable power suitable to fusing the powder material 60 into a plurality of layers. For example, in some embodiments the laser generating system 40 may generate a laser beam 42 of from at least about 200 watts to about 1,000 watts. It should be appreciated, however, that any other type and power of laser may alternatively or additionally be utilized such as based on the characteristics of the powder material 60.

The laser generating device 40 may thereby generate a laser beam 42 to fuse (sinter or melt) successive layers of the powder material 60. For example, each layer of powder material 60 may have a build layer thickness t of from about 5 microns to about 2,000 microns. In some embodiments, each layer of powder material 60 may have a build layer thickness t of from about 10 microns to about 200 microns, or even from about 20 microns to about 50 microns. In even some embodiments, the build layer thickness of the powder material may scale with the power of the laser beam 42.

Still referring to FIGS. 1 and 2, in some embodiments one or more gasses 70 may be utilized within the additive manufacturing system 10, such as within the build chamber 50 of the additive manufacturing device 100. For example, in some embodiments, the additive manufacturing process may be carried out under an inert atmosphere. In some embodiments, the gas may comprise helium, argon, hydrogen, oxygen, nitrogen, air, nitrous oxide, ammonia, carbon dioxide and combinations thereof.

In even some embodiments, the additive manufacturing system 10 may be able to heat the powder material 60, such as through heated gas 70, prior to the powder material 60 being fused by the laser beam 42. Furthermore, the heated gas 70 may heat other objects within the build chamber 51 in a manner that may help maintain temperatures of already processed layers of the powder material 60 closer to the temperature of layers being fused.

The additive manufacturing system 10 may further comprise a controller 30 to control the build plate 55, powder recoater 160, fiber weaver 180 and/or laser generating system 40 via control signals 32. Alternatively, each of the different components may comprise individual or partially shared controllers 30 that combine to operate the overall additive manufacturing system 10. In even some embodiments, one or more of the components may at least be partially manually controlled by an operator in addition to or in replacement of a controller 30.

For example, in operation, the form and the material buildup of the fiber reinforced composite object 50 may be provided as a design data file 20 such as in a computer. The design data file 20 also may take various forms. For example, the design data file 20 may be a computer aided design (CAD) file or scan data. The CAD file of the three-dimensional electronic representation may be converted into another file format available in the industry such as stereolithographic or standard triangle language (STL) file format. The STL format may then be processed by any suitable slicing program to produce an electronic file that converts the fiber reinforced composite object 50 into an STL formal file comprising the fiber reinforced composite object 50 represented as two-dimensional slices including laser fused material layers 61 and fiber reinforcement layers 81 (exemplarily illustrated in FIG. 3).

The layer information generated form this process may then be imputed into the controller 30, which produces the control signals 32 delivered to a computer (not shown) of the additive manufacturing device 100 to control the build plate 55, powder recoater 160, fiber weaver 180 and/or laser generating system 40 to build the fiber reinforced composite object 50 layer by layer.

It should be appreciated that the additive manufacturing system 10 and the additive manufacturing device 100 illustrated in FIGS. 1 and 2 are not meant to imply physical and/or architectural limitations to the manner in which different environments may be implemented. For example, the different components illustrated as functional components in FIGS. 1 and 2 may be combined or further separated into additional blocks depending on the particular implementation.

Referring now additionally to FIG. 3, the additive manufacturing system 10 can be utilized to fabricate a fiber reinforced composite object 50. The fiber reinforced object 50 comprises a plurality of laser fused material layers 61 each comprising powder material fused by a laser. As discussed herein, each of the plurality of laser fused material layers 61 may be formed via fusing a variety of powder materials, such as a cobalt-chrome alloy. Furthermore, each of the laser fused material layers 61 may comprise a build layer thickness t that is based on the original powder material 60 and the laser beam 42. For example, each of the laser fused material layers 61 may comprise a build layer thickness t of from about 5 microns to about 2,000 microns. In even some embodiments, different laser fused material layers 61 may comprise different materials, different thicknesses or other different properties.

The fiber reinforced composite object 50 further comprises at least one fiber reinforcement layer 81 disposed between adjacent laser fused material layers 61. The fiber reinforcement layer 81 comprises a fiber material 80 such as carbon fiber or any other metal or alloy fiber. The fiber material 80 of the fiber reinforcement layer 81 may have a variety of configurations such being unidirectional, multi-directional, solid fibers, hollow tubes or other variations.

In some embodiments, the fiber reinforced composite object 50 may comprise alternating layers of laser fused material layers 61 and fiber reinforcement layers 81. However, in some embodiments, a plurality of laser fused material layers 61 may be disposed between fiber reinforcement layers 81. Furthermore, similar to the laser fused material layers 61, different fiber reinforcement layers 81 may comprise different materials, different thicknesses, different orientations or other different properties.

The resulting fiber reinforced composite object 50 may thereby be designed and fabricated using a variety of customizations to facilitate performance in the intended application. In some embodiments, the fiber reinforced composite object 50 may comprise a gas turbine component such as one used in combustion stage or hot gas path stage. In other embodiments, the fiber reinforced composite object 50 may comprise any other type of component suitable for comprising a combination of laser fused material layers 61 and fiber reinforcement layers 81.

Figure 4:
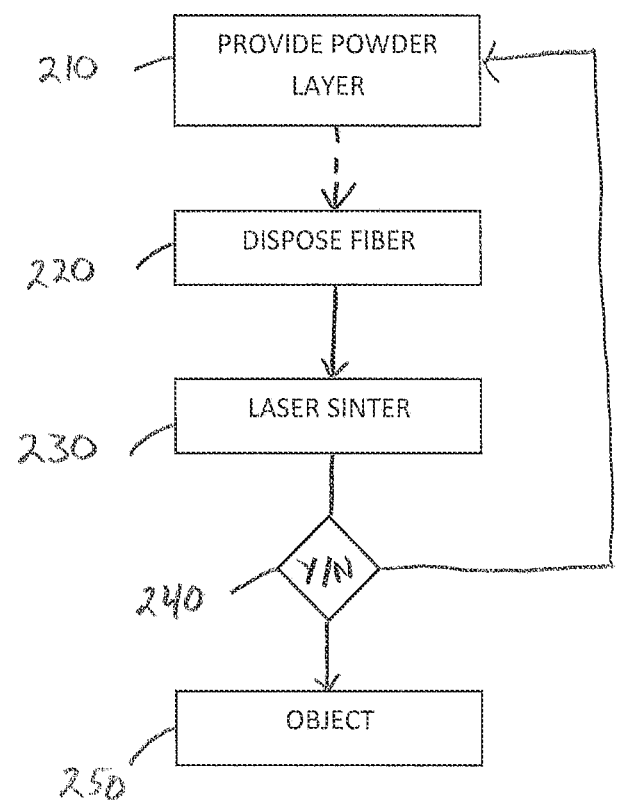

Referring now additionally to FIG. 4, a method 200 is illustrated for fabricating a fiber reinforced composite object 50 as discussed above such as by using the additive manufacturing system 10 disclosed and described herein.

The method 200 comprises providing at least a first layer of powder material 60 in step 210 and disposing a fiber material 80 adjacent the at least first layer of powder material 60 to form a fiber reinforcement layer 81 in step 220. Providing the powder material 60 in step 210 and disposing the fiber material 80 in step 220 can for example be accomplished using the additive manufacturing system 10 as disclosed herein, manually, or combinations thereof. The method 200 further comprises applying a laser energy in step 230, such as through a laser generating system 40, to the at least first layer of powder material 60 so as to fuse said powder material 60 into at least a first laser fused material layer 61. The first laser fused material layer 61 and the adjacent fiber reinforcement layer 81 thereby combine to at least partially form the fiber reinforced composite object 50 as discussed herein. In some embodiments, applying the laser energy in step 230 to fuse the powder material 60 may comprise multiple passes of the laser, i.e., multiple iterations of the laser hitting the targeted area to apply enough energy to fuse the powder material 60.

Specifically, the method 200 can further comprise a processing step 240 to determine whether the fiber reinforced composite object 50 is complete. If it is not complete, the method 200 can return to step 210 for providing at least a second layer of powder material 60 and subsequent application of laser energy to the at least second layer of powder material 60 in step 230. Depending on the design of the fiber reinforced composite object 50, the repetition may also include disposing additional fiber material 80 in step 220 to form an additional fiber reinforcement layer 81. Method 200 may thereby iterate to provide any desired number and order of laser fused material layers 61 and fiber reinforcement layers 81 until the final fiber reinforced composite object 50 is completed in step 250.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An additive manufacturing method for fabricating a fiber reinforced composite object, the additive manufacturing method comprising:
    providing at least a first layer of powder material;
    disposing a fiber material adjacent the at least first layer of powder material to form a fiber reinforcement layer; and,
    applying a laser energy to the at least first layer of powder material so as to fuse the powder material into at least a first laser fused material layer adjacent the fiber reinforcement layer of the fiber-reinforced composite object.

2. The additive manufacturing method of claim 1, further comprising:
    providing at least a second layer of powder material; and,
    applying a laser energy to the at least second layer of powder material so as to fuse the powder material into at least a second laser fused material layer of the fiber reinforced composite object.

3. The additive manufacturing method of claim 2, further comprising disposing an additional fiber material adjacent the at least second layer of powder material to form an additional fiber reinforcement layer.

4. The additive manufacturing method of claim 1, wherein the powder material comprises a cobalt-chrome alloy.

5. The additive manufacturing method of claim 1, wherein the fiber material comprises fiber.

6. The additive manufacturing method of claim 1, wherein the fiber material comprises hollow tubes.

7. The additive manufacturing method of claim 1, wherein applying the laser energy to the at least first layer of powder material comprises a plurality of passes of the laser energy.

8. The additive manufacturing method of claim 1, wherein a diameter of the fiber material is less than or equal to a build layer thickness of the powder material.

* * * * *